United States Patent
Steinert et al.

(10) Patent No.: US 10,261,817 B2
(45) Date of Patent: Apr. 16, 2019

(54) SYSTEM ON A CHIP AND METHOD FOR A CONTROLLER SUPPORTED VIRTUAL MACHINE MONITOR

(71) Applicants: Frank Steinert, Rosenheim (DE); Markus Baumeister, Munich (DE)

(72) Inventors: Frank Steinert, Rosenheim (DE); Markus Baumeister, Munich (DE)

(73) Assignee: NXP USA, Inc., Austin, TX (US)

( * ) Notice: Subject to any disclaimer, the term of this patent is extended or adjusted under 35 U.S.C. 154(b) by 438 days.

(21) Appl. No.: 14/445,788

(22) Filed: Jul. 29, 2014

(65) Prior Publication Data
US 2016/0034291 A1    Feb. 4, 2016

(51) Int. Cl.
*G06F 9/455* (2018.01)

(52) U.S. Cl.
CPC ............ *G06F 9/45558* (2013.01); *G06F 2009/45579* (2013.01); *G06F 2009/45595* (2013.01)

(58) Field of Classification Search
CPC . G06F 9/45558; G06F 9/3877; G06F 13/1652
USPC .......................................................... 718/1
See application file for complete search history.

(56) References Cited

U.S. PATENT DOCUMENTS

| | | | |
|---|---|---|---|
| 7,174,550 B2 | 2/2007 | Brice, Jr. et al. | |
| 7,937,701 B2* | 5/2011 | Kinney | G06F 9/544 713/300 |
| 8,176,501 B2* | 5/2012 | Prakash | G06F 9/45558 719/317 |
| 2007/0088829 A1* | 4/2007 | Shima | H04L 45/60 709/226 |
| 2008/0313655 A1* | 12/2008 | Pope | G06F 9/45533 719/319 |
| 2009/0049453 A1 | 2/2009 | Baran et al. | |
| 2009/0210888 A1 | 8/2009 | Lee et al. | |
| 2009/0307689 A1 | 12/2009 | Sudhakar | |
| 2009/0307711 A1* | 12/2009 | Krishnamurthy | G06F 9/5077 719/313 |
| 2012/0079478 A1* | 3/2012 | Galles | H04L 47/2441 718/1 |

(Continued)

OTHER PUBLICATIONS

PCI-SIG, "PCI-SIG IO Virtualization," downloaded from <<http://www.pcisig.com/specifications/iov>> on Jul. 2, 2014; 1 page.

*Primary Examiner* — Wei Y Zhen
*Assistant Examiner* — Brahim Bourzik (57) ABSTRACT

A system on a chip comprising: a first communication controller; at least one second communication controller operably coupled to the first communication controller; at least one processing core operably coupled to the first communication controller and arranged to support software running on a first partition and a second partition; and a virtual machine monitor located between the first and second partitions, and the at least one processing core and arranged to support communications there between. The first communication controller is arranged to: generate or receive at least one data frame; and communicate the at least one data frame to the at least one second communication controller; such that the at least one second communication controller is capable of routing the at least one data frame to the second partition bypassing the virtual machine monitor.

20 Claims, 5 Drawing Sheets

(56) References Cited

U.S. PATENT DOCUMENTS

| | | | |
|---|---|---|---|
| 2013/0254766 A1* | 9/2013 | Zuo | H04L 47/20 |
| | | | 718/1 |
| 2013/0318268 A1* | 11/2013 | Dalal | G06F 13/1652 |
| | | | 710/113 |
| 2014/0201761 A1* | 7/2014 | Dalal | H04L 47/193 |
| | | | 718/108 |
| 2015/0186174 A1* | 7/2015 | Borkmann | G06F 9/45558 |
| | | | 718/1 |
| 2016/0057014 A1* | 2/2016 | Thakkar | G06F 9/45558 |
| | | | 709/223 |
| 2016/0094667 A1* | 3/2016 | Jani | H04L 69/32 |
| | | | 709/202 |
| 2016/0147687 A1* | 5/2016 | Check | G06F 1/24 |
| | | | 710/117 |
| 2016/0188207 A1* | 6/2016 | Choi | G06N 3/063 |
| | | | 711/153 |
| 2019/0034363 A1* | 1/2019 | Palermo | G06F 13/1668 |

* cited by examiner

SYSTEM ON A CHIP AND METHOD FOR A CONTROLLER SUPPORTED VIRTUAL MACHINE MONITOR

FIELD OF THE INVENTION

The field of this invention relates to a system on a chip and a method for a controller supported virtual machine monitor, and in particular to a virtual machine monitor supported by one or more hardware implemented communication controllers.

BACKGROUND OF THE INVENTION

As computing power continues to increase, operating systems supporting various software applications have also been able to increase in sophistication and complexity, resulting in the support of multi-tasking environments.

With the introduction of virtualisation, a virtual machine environment has been introduced into computer systems between hardware and the operating system. This virtual machine environment is able to support multiple operating systems, and has the ability to allow software to be partitioned into virtual systems so that the software running on one virtual system, within one partition, is not able to influence software of another virtual system on another partition.

These virtualisation techniques have been recently implemented within embedded computing systems, such as multi-core microcontroller units (multi core MCUs) or powerful single core MCUs.

Figure 1:
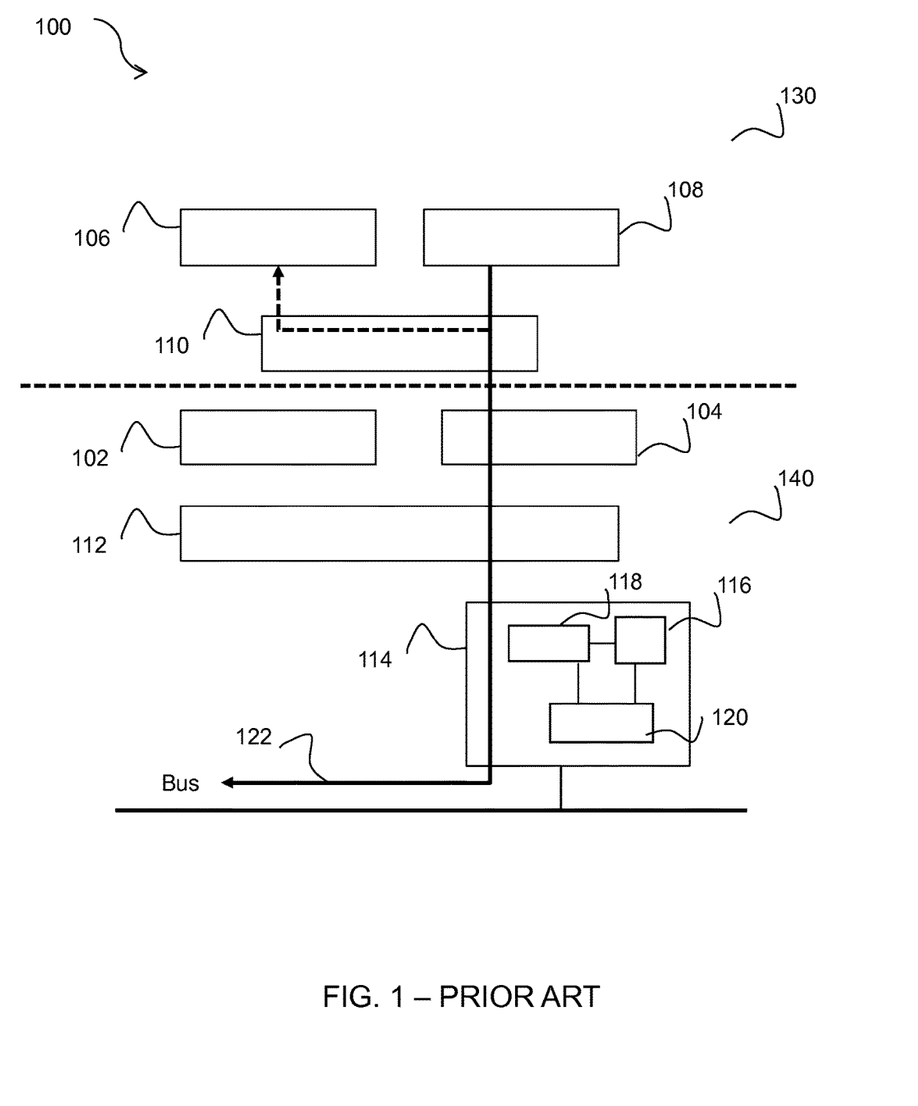
FIG. 1 illustrates a block diagram of a known multi-core processing device.

Referring to FIG. 1, a block diagram of a known multi-core processing device 100 is illustrated. The known multi-core processing device 100 illustrates a software region 130 and a hardware region 140. The known multi-core processing device 100 comprises a first processing core 102 and a second processing core 104, wherein the first processing core 102 supports software running on a first partition 106 and the second processing core 104 supports software running on a second partition 108. In the hardware region 140, only the cores execute the whole software.

A virtual machine monitor, such as a hypervisor 110, is part of the software section and located between the partitions 106, 108 and the respective cores 102, 104 in order to support communications between them. The hypervisor 110 acts as a separate logical entity, but is physically part of the controlled partitions and executed by the core(s) 102, 104. A bus 112 is used to interface the cores 102, 104 with other elements of the system (not shown).

Generally, locally received data frames will be generated by the hypervisor 110, and the hypervisor 110 is responsible for management of shared transmission and reception resources, which may include interrupt generation of processing cores and/or override handling.

A communication controller 114, comprising a host controller interface 116, protocol engine 118 and data buffers 120 operably connected, is implemented to control aspects of the known multi-core processing device 100.

For independent activity of the separate first and second partitions 106, 108, concurrently used peripherals, (not shown) coupled to the multi-core processing device 100 via a bus 122, must be virtualised. Although this known multi-core processing device 100 describes a two partition configuration, for explanatory purposes, any number of partitions and number of cores (e.g. one to many cores) may be supported.

Generally, the communication controller 114 must be virtualised in order to support independent activity of the separate partitions 106, 108. This is a resource intensive software task for the hypervisor 110, particularly if inter-partition communication, or worse inter-core communication, is required.

The hypervisor 110 must intercept all accesses on concurrently used peripherals that could cause concurrent interference issues. The risk of interference is possible if more than one partition accesses the same resource at, or close to, the same time. In order to prevent the risk of interference, the hypervisor 110 must serialise the accesses by applying delayed time-controlled and/or event-controlled activities to maintain synchronicity of all communication partners.

It is known that local communication between partitions 106 and 108 requires the hypervisor 110 to emulate the whole or a majority of the host controller interface 116, residing within the communication controller 114, if partitions 106 and 108 utilize the same bus 122. The emulation of the host controller interface 116 generally requires a large amount of resources.

In the case of fan out of a received datagram (necessary if partitions 106 and 108 utilize the same bus 122), the hypervisor 110 must multiply host controller interface 116 information including: reception status, raising multiple interrupts, maintaining interrupt status for each partition, and emulate received datagrams by preserving correct timing and/or correct synchronicity.

Figure 2:
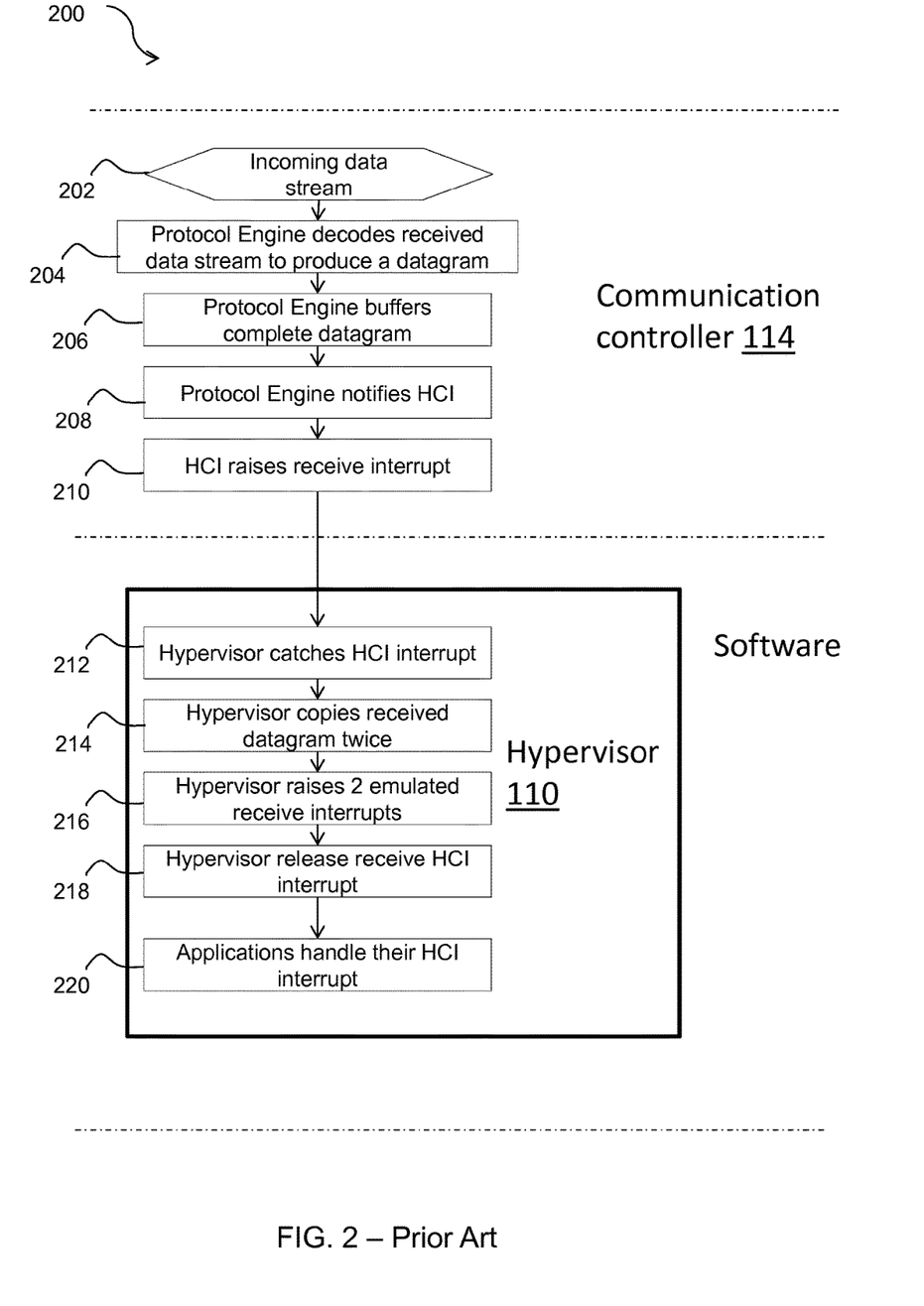
FIG. 2 illustrates a known operation of the multi-core processing device from FIG. 1.

Referring to FIG. 2, a known operation 200 of parts of the multi-core processing device 100 of FIG. 1, namely the communication controller 114 and hypervisor 110, is illustrated. Typically, an incoming data stream 202 is received by the communication controller 114 and subsequently decoded at 204 by a protocol engine to provide a datagram. The protocol engine buffers the decoded data stream until a complete datagram is created 206. At 208, the protocol engine notifies a host controller interface (HCI), which subsequently registers and outputs a receive interrupt at 210. With this in mind, it is worth confirming that the term 'interface', with reference to a HCI, is somewhat of a misnomer, as the HCI is a little less complex than the protocol engine. The HCI maintains status information, decodes commands and often also implements state machines for serving complex data exchange protocols (even for host-controller communication). The HCI must cover two tasks: enable data flow and provide capabilities for data flow control.

The hypervisor 110 catches the HCI generated interrupt at 212 and subsequently makes two copies of the received datagram at 214. At 216, the hypervisor 110 raises two emulated receive interrupts, and, at 218, the hypervisor 110 releases the received interrupts. At 220, the applications within the first partition 102 and second partition 104 handle their respectively received interrupts from the hypervisor 110.

Thus, the virtualisation of communication controller 114 is a resource intensive software task for the hypervisor 110, especially if inter-partition communication is required, or worse inter-core communication is required, as the hypervisor 110 is responsible for generating locally received data frames and management of shared transmission and reception resources, such as interrupt generation and override handling.

In this case, the hypervisor 110 is required to copy, emulate and release two copies of the received interrupt for the first partition 102 and second partition 104. If further partitions were implemented, even more copy, emulate and release steps would be required, further stretching the resources of the hypervisor 110 and the processing device 100.

SUMMARY OF THE INVENTION

The present invention provides a system on a chip and a method therefor as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

For example, although examples of the invention are described with reference to a particularly mapping of multi-core processing and partitions thereof (where partitions may be mapped to the cores on a 1:1 (core:partition) basis), it is envisaged that the examples herein described may be equally applied to other architectures, for example where multiple partitions reside jointly on a single core processor or m:1 or m:n. Hence, examples of the invention apply equally to mixed scenarios.

In examples of the invention, the software may be partitioned and the partitions may be managed by the hypervisor. In addition, the underlying hardware of the architecture(s) may be partitioned into one or multiple cores.

In examples of the invention, a system on a chip comprises: a first communication controller; at least one second communication controller operably coupled to the first communication controller; at least one processing core operably coupled to the first communication controller and arranged to support software running on a first partition and a second partition; and a virtual machine monitor located between the first and second partitions, and the at least one processing core and arranged to support communications there between. In examples of the invention, the first communication controller is arranged to: generate or receive at least one data frame; and communicate the at least one data frame to the at least one second communication controller; such that the at least one second communication controller is capable of routing the at least one data frame to the second partition bypassing the virtual machine monitor.

Furthermore, in examples of the invention, a method for a controller supported virtual machine monitor located between partitions and at least one processing core in a system on a chip is described. The system on a chip comprises: a first communication controller and at least one second communication controller operably coupled to the first communication controller. The method comprises: running software, by at least one processing core operably coupled to the first communication controller, on a first partition and a second partition, supporting communications between the first and second partitions and the at least one processing core by the virtual machine monitor; generating or receiving at least one data frame by the first communication controller; communicating, by the first communication controller, the at least one data frame to the at least one second communication controller; and routing by the at least one second communication controller the at least one data frame to the second partition, bypassing the virtual machine monitor Referring to FIG. 3, a block diagram of an example of a modified multi-core processing device 300 is illustrated. In this example, the modified multi-core processing device 300 may comprise a first communication controller 314 and a second communication controller 330.

Figure 3:
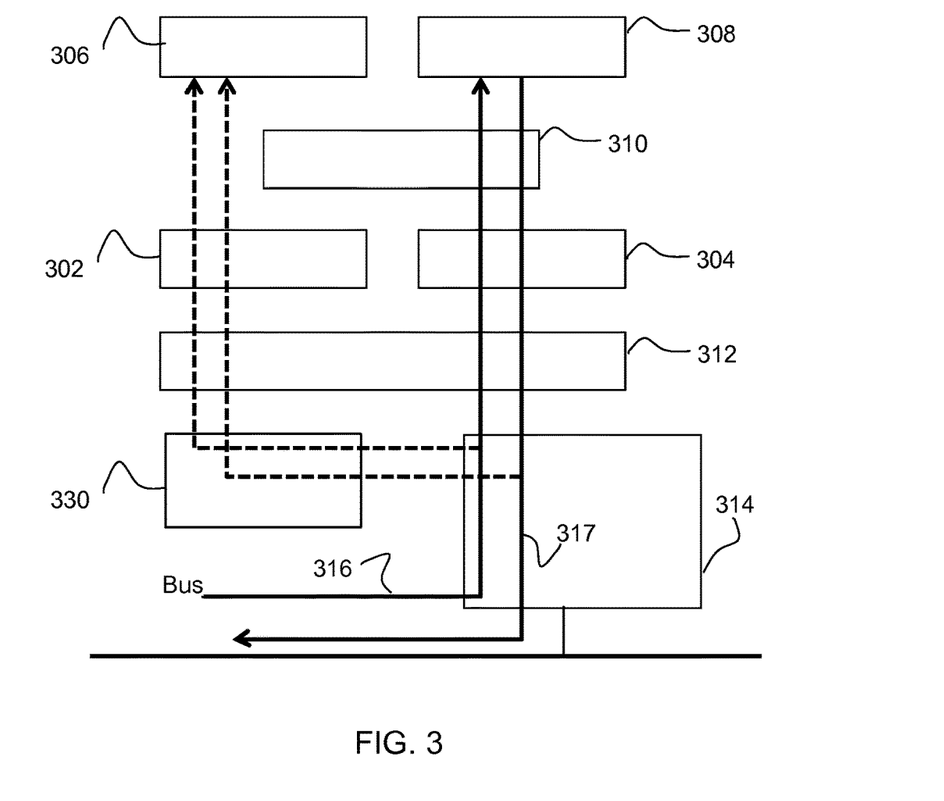
FIG. 3 illustrates a block diagram of a modified multi-core processing device.

In some examples, the first communication controller 314 may comprise additional functionality to the communication controller 114 of FIG. 1, which may enable the first communication controller 314 to communicate with the second communication controller 330. In some examples, the second communication controller 330 may have reduced functionality compared to communication controller 114 of FIG. 1.

In some further examples, the second communication controller 330 may comprise additional functionality, which may allow it to interface with the first communication controller 314, without the first communication controller 314 requiring additional functionality. In this example, the second communication controller 330 may still comprise less functionality than the first communication controller 114 illustrated in FIG. 1.

In some examples, second communication controller 330 may lack some functionality of the protocol engine, but may comprise all the necessary logic for a pseudo-polling approach, for example capturing and interrogating (sometimes referred to as 'sniffing') the data that it receives and transfers from/to first communication controller 314. Such an example is useful for technology migration for instance, but depends on the design and functionality supported by first communication controller 314.

In the example illustrated in FIG. 3, the first communication controller 314 may be operably coupled to the second communication controller 330, and in some examples (as illustrated) directly coupled, thereby enabling the first communication controller 314 and second communication controller 330 to communicate with each other.

In this example, by operably coupling the first communication controller 314 and second communication controller 330 together, hypervisor 310 may be bypassed for some or all communication controller functions, for example receive and transmit functionality. Thus, examples of the invention may provide for a hardware emulation of communication data frame reception for a number (up to all bar one) hypervisor controlled partitions. In this manner, a reduction in the performance requirements of the hypervisor may be achieved. The hardware emulation may include partition specific data frame buffer provision for support of asynchronous buffer access. In this example, the partition specific data frame buffer provision may include partition specific interrupt generation and maintenance. Such partition specific data frame buffer provision may apply always towards all hypervisor controlled partitions, if a data frame is received from a source that is external to the system-on-a-chip. Alternatively, the hardware emulation may include partition specific data frame buffer provision for support of asynchronous buffer access, direction and partition specific interrupt generation and maintenance. Such partition specific data frame buffer provision may apply always towards all other hypervisor controlled partitions, if a data frame has been sent from within the system-on-a-chip, from any hypervisor controlled partition.

Therefore, in some examples, some or all of the communication controller functions requiring virtualisation by the hypervisor 310 may not be required. In some examples, this may facilitate offloading some functionality of the hypervisor 310, and thereby may allow saving of computational capabilities of cores 302, 304, which would no longer be required to execute instructions for the hypervisor 310. Thus, some hypervisor functionality can be bypassed in part or completely, such as fan-out, interrupt handling, parts of error handling, read and write access on datagram buffers, etc. Some functionality of the hypervisor 310 must remain with the hypervisor 310 and not be bypassed, for instance the hypervisor 310 controls common communication controller properties, such as clock gates, bitrate and so on.

Further, each hypervisor 310 activity may require several hundred clock cycles. Therefore, reducing or bypassing some functionality of the hypervisor 310 in accordance with examples of the invention may free up hundreds of clock cycles per activity.

In this example, the first communication controller 314 may be operable to receive externally generated data frames 316 or internally (locally) generated data frames 317, rather than the hypervisor 310. In this example, the first communication controller 314 is arranged to communicate the generated data frames to the second communication controller 330 and the second processing core 304. The generated data frames may be received locally by the second communication controller 330, and subsequently transmitted to the first processing core 302 and thereafter the first partition 306. Such a transmission may be via bus 312, which may be a crossbar interface. Therefore, in this example, reception of one or more data frames may be facilitated without requiring hypervisor 310 intervention(s).

In some examples, the hypervisor 310 may be additionally or alternatively responsible for managing transmit resource sharing, rather than solely receive resource sharing. For example, in cases of synchronous communication busses (e.g. FlexRay™) partitions may operate asynchronously, in a decoupled manner, and poll the receive buffers controlled by their task schedule. In such a case, the hypervisor 310 may be sufficient to facilitate the operations, because the gain provided by the hardware support could be low. In such a transmit sense, from a partition point of view, a datagram is transferred to the communication controller that generates a data frame that is sent via the external communication bus, for example under certain (bus protocol) constraints, but even independent from any partitions task schedule.

In some examples, the extent of use of the hypervisor 310 when implementing the first communication controller 314 and the second communication controller 330 may be dependent on the chosen implementation and functionality of the first communication controller 314 and the second communication controller 330.

Therefore, in some examples, the hypervisor 310 may be only responsible for managing configurations for the modified multi-core processing device 300, which may be performed once per microcontroller initiation phase, for example.

Figure 4:
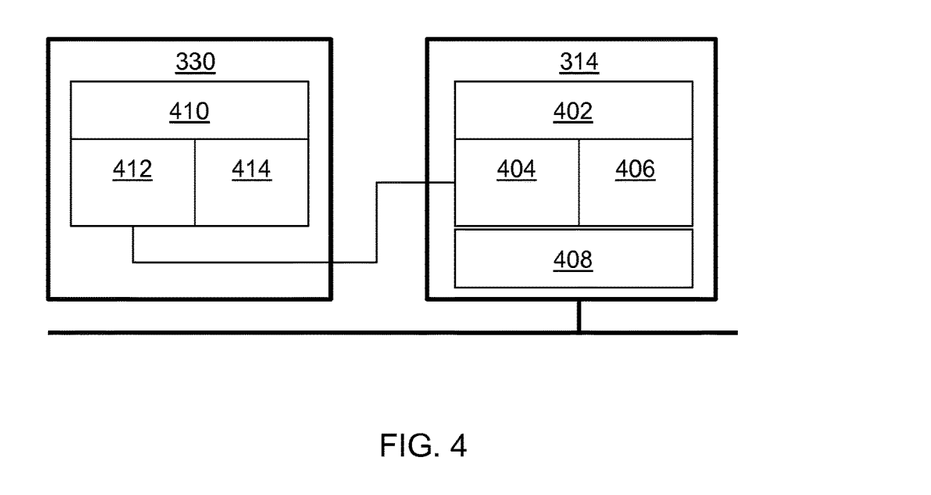
FIG. 4 illustrates an example block diagram of a first communication controller and a second communication controller.

Referring to FIG. 4, an example block diagram of a first communication controller 314 and a second communication controller 330 is illustrated, which may be utilised, for example, within the modified multi-core processing device 300 of FIG. 3.

In this example, the first communication controller 314 may comprise a host controller interface (HCI) 402, a protocol engine 404, one or more data buffers 406 and a bus interface 408. Further, the second communication controller 330 may comprise a simplified subset of the functionality of the first communication controller 314. In some instances, the constituent parts of the second communication controller 330 may comprise a simplified subset of the corresponding constituent parts of the first communication controller 314. Therefore, in this example, the second communication controller 330 may comprise a second host controller interface 410, a second protocol engine 412 and one or more data buffers 414. In this example, the first communication controller 314 is operably coupled to the second communication controller 330 via protocol engines 404, 412.

In some examples, the HCI 402 may be arranged to provide access for control purposes, e.g. for protocol parameters, buffer configuration, for datagram input output, generating interrupts, etc. The HCI 402 is served by the application (for example, a software driver, a hypervisor, etc.) linking it with the protocol engine 404 and the one or more data buffer(s) 414.

In some examples, the protocol engine 404 may be responsible for applying the specified communication protocol in terms of pulling datagrams from the one or more data buffer(s) 414 and generating and transmitting data frames by consideration of all the protocol (and configuration) constraints, and vice versa.

In some examples, a lightweight version of the protocol engine 412 of the second communication controller 330 may, for instance, receive a completely decoded datagram from the main protocol engine 404 and serve its own copy of the one or more data buffers 414 and HCI module 410.

In some examples, the one or more data buffer(s) 406, 414 store(s) received data frames and data frames for transmission. The one or more data buffer(s) 406, 414 may be arranged to follow certain storage strategies, such as first-in, first-out (FIFO), last-in, first-out (LIFO), dedicated messages or combinations, etc. The one or more data buffer(s) 406, 414 may also be arranged to handle overflow/underflow conditions, single read constraints, and so on.

In some examples, the variant of the second communication controller 330 illustrated in FIG. 4 may be referred to as a simplified variant communication controller 330 with an internal link to a single bus connected command controller 314. In some examples, therefore, the second communication controller 330 may have a full set of constituent parts and/or functional logic, or a subset of the full set of the constituent parts and/or functional logic, which may eventually be extended by, say, lightweight versions of the missing building blocks. A use of lightweight versions of the missing building blocks may at least allow removal of links and/or transceivers on a printed circuit board (PCB) or integrated circuit, whilst achieving some offloading hypervisor functionality.

In this example, information received by the first communication controller 314 may be duplicated with one copy sent to the second communication controller 330. In this manner, the received information may be handled separately, by each respective communication controller 314, 330, for each receiving partition, for example, partitions 306, 308 from FIG. 3. In this example, the first communication controller 314 and the second communication controller 330 may be configured to jointly handle internally generated frames, and/or configured to concurrently handle received (transmit) frames, which may be from any source.

The received information may comprise one or more of, for example, received first-in first-out (FIFO) information, received interrupt information, received error indications, etc.

In some examples, by utilising a first communication controller 314 and a second communication controller 330 in this manner, it may be possible to bypass the hypervisor 310 during, for example, at least, a data frame reception phase.

Figure 5:
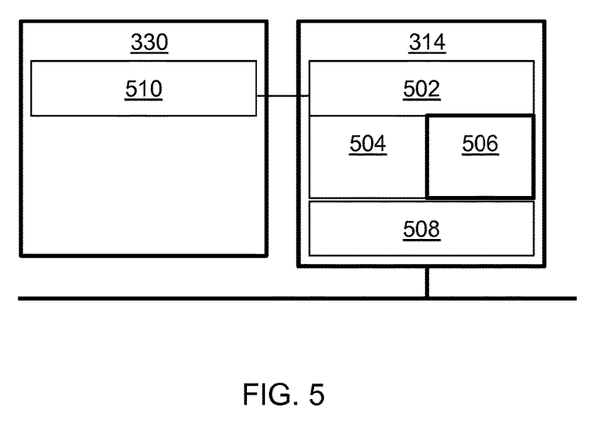
FIG. 5 illustrates a further example block diagram of a first communication controller and a second communication controller.

Referring to FIG. 5, a yet further example block diagram of a first communication controller 314 and a second communication controller 330 is illustrated, which, again, may be utilised with the modified multi-core processing device 300 of FIG. 3.

In this example, the first communication controller 314 may comprise a host controller interface 502, protocol engine 504, one or more data buffers 506 and a bus interface 508. The second communication controller 330 may comprise at least a second host controller interface 510. In this example, the first communication controller 314 and the second communication controller 330 may be operably coupled to each other via the host controller interfaces 502, 510.

In this example, the second communication controller 330 has been illustrated with only a host controller interface 510. Therefore, in this example, the first communication controller 314 may comprise enhanced functionality to allow the second communication controller 330 to perform similar functionality to the first communication controller 314. In some examples, the enhanced functionality may comprise enhancing one or more of the host controller interface 502, protocol engine 504, and/or the one or more data buffers 506, to the extent that one or more of these modules or components is arranged to perform the desired function for the first communication controller 314 and also perform a similar function for the second communication controller 330.

In some examples, the first communication controller 314 may comprise additional functionality that may facilitate communication with the host controller interface 510 of the second communication controller 330. In some examples, the additional functionality may comprise extending functionality in the first communication controller 314 regarding interrupt status representation and interrupt handling.

Therefore, in some examples, a plurality of second communication controllers 330 each comprising at least a host controller interface, may be operably coupled to the first communication controller 314.

Examples of the invention envisage a number of different architectures that may support such re-distribution of functionality. For example, in other examples, an additional communication bus may be introduced between the protocol engine 504 of the HCI 502 of the first (main) communication controller 314 on one side and the HCI(s) 510 of the second communication controller(s) 330. The additional communication bus may be arranged to arbitrate the HCI accesses and replicate the control flow from the protocol engine 504 to the main HCI 502. Thus, in this example, all HCIs 510 would use the single protocol engine 504 and the one or more data buffers 506 of the first (main) communication controller 314.

In such scenario, the one or more data buffers 506 may be enhanced in order to be capable for replicating buffer content as well or for sophisticated buffer handling, even in a multi-client environment. In some examples, this enhancement may be dependent upon the bus protocol characteristics.

In one example, additionally and/or alternatively, the HCI 502 of the first (main) communication controller 314 may be enhanced in order to serve several HCI 510 slaves, which operate in a concurrent, peer-to-peer manner. In one example, additionally and/or alternatively, the protocol engine 504 may also be enhanced in order to concurrently serve multiple HCIs 510. In this manner, an additional inner bus may be avoided.

In a transmit sense, the hypervisor may be bypassed generally, if the HCI 502 of the first (main) communication controller 314 and the several HCI 510 slaves take care of serialization of concurrent accesses and synchronization.

Figure 6:
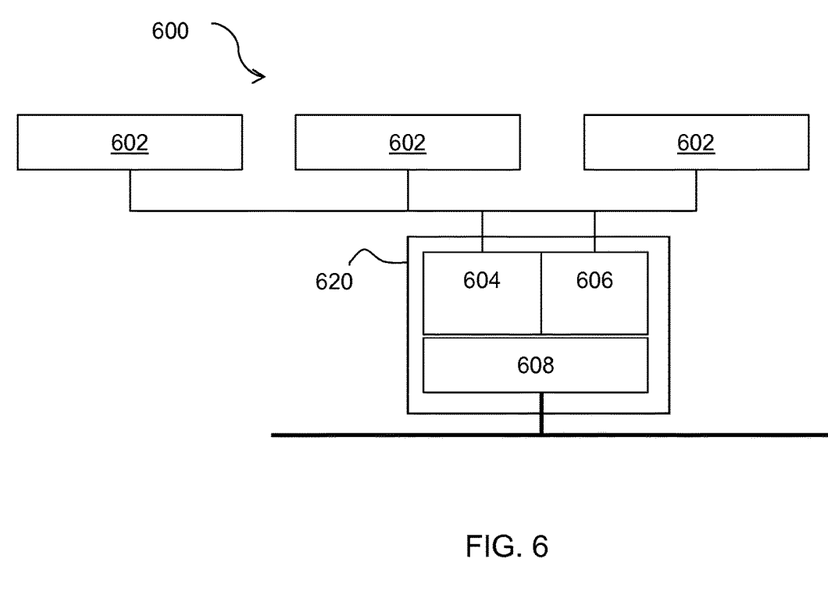
FIG. 6 illustrates an example implementation of a communication controller.

Referring to FIG. 6, an example implementation of a communication controller application 600 is illustrated. In this example, a plurality of simplified communication controller variants 602 may be operably coupled to a communication controller 620.

In this example, the communication controller 620 may comprise a protocol engine 604, one or more data buffers 606 and a bus interface 608, wherein the functionality of the communication controller 620 may be enhanced to allow a plurality of simplified communication controller variants 602 to operably couple to the communication controller 620. For example, the protocol engine 604 may be enhanced to allow it to communicate with, and order concurrent accesses by, the plurality of simplified communication controller variants 602. In one example, the protocol engine 604 may replicate substantially all control flow, for instance towards the HCI for all other HCIs. Afterwards, substantially all reception related access of the HCIs may go to the one or more data buffers 606. In another similar example, in a transmission direction, the protocol engine 604 may receive transmit requests from the HCIs pointing to the one or more data buffers 606 that contain the affected datagram, and the protocol engine 604 executes the arbitration. A skilled artisan will readily appreciate that several scenarios can be established from a functional point of view, but the hardware implementation details of other architectures may depend on various constraints, such as implementation technology, protocols being supported, performance requirements, and so on.

In this example, the plurality of simplified communication controller variants 602 may each comprise a host controller interface, in a similar manner to the arrangement in FIG. 5, wherein the host controller interface may be operable to communicate with the protocol engine 604 and the one or more buffers 606 of the communication controller 620.

In some examples, the simplified communication controller variants 602 and the communication controller 620 may be utilised with any communication protocol.

In some other examples the simplified controller variants 602 and the communication controller 620 may be utilised with a controller area network (CAN), FlexRay, or Ethernet serial communication. Further, in some examples, the simplified communication controller variants 602 and the communication controller 620 may be operably coupled to a host's respective controller interface circuitry.

In some examples, concurrent accesses by the plurality of simplified communication controller variants 602 may be controlled by software residing in, or operably coupled to, the protocol engine 604, or may be controlled by the hypervisor or by an improved controller.

Utilising a plurality of simplified communication controller variants 602, wherein each simplified communication controller variant 602 may be operably coupled to an individual partition and to the communication controller 620, may allow a hypervisor, for example hypervisor 310 of FIG. 3 (and known hypervisor 110 of FIG. 1), to be bypassed in at least a receive operation.

In some examples, depending on the number of simplified communication controller variants 602 to be operably coupled to the communication controller 620, the communication controller 620 may require enhanced interrupt status representation and interrupt handling. For example, each interrupt status flag may exist at each HCI instance, in order to allow asynchronous interrupt handling of the different partitions (for example each partition may have its own interrupt handler. In some instances, a reception interrupt flag of a dedicated partition would only be removed if the assigned partition has read the receive data frame.

In some other examples, depending on the number of simplified communication controller variants 602 to be operably coupled to the communication controller 620, some or all of the simplified communication controller variants 602 may require additional functionality other than a host controller interface. In some examples, the additional functionality may comprise one or more of; a protocol engine 604, and one or more buffers 606, as illustrated in FIG. 4.

In some examples, the number of simplified communication controller variants 602 may be configurable at the time of execution of the communication controller application 600. For example, at the time of execution of the communication controller application 600, each partition, for instance, may configure (say, via a register interface (not shown)) the datagram that it will receive. In another example, at the time of execution of the communication controller application 600, each partition, for instance, may configure how many buffers a FIFO shall comprise and/or how the acceptance mask for this is shaped.

In some other examples, the number of simplified communication controller variants 602 may be hard coded, for example providing a simplified communication controller variant 602 for each core of a multi-core processor.

Figure 7:
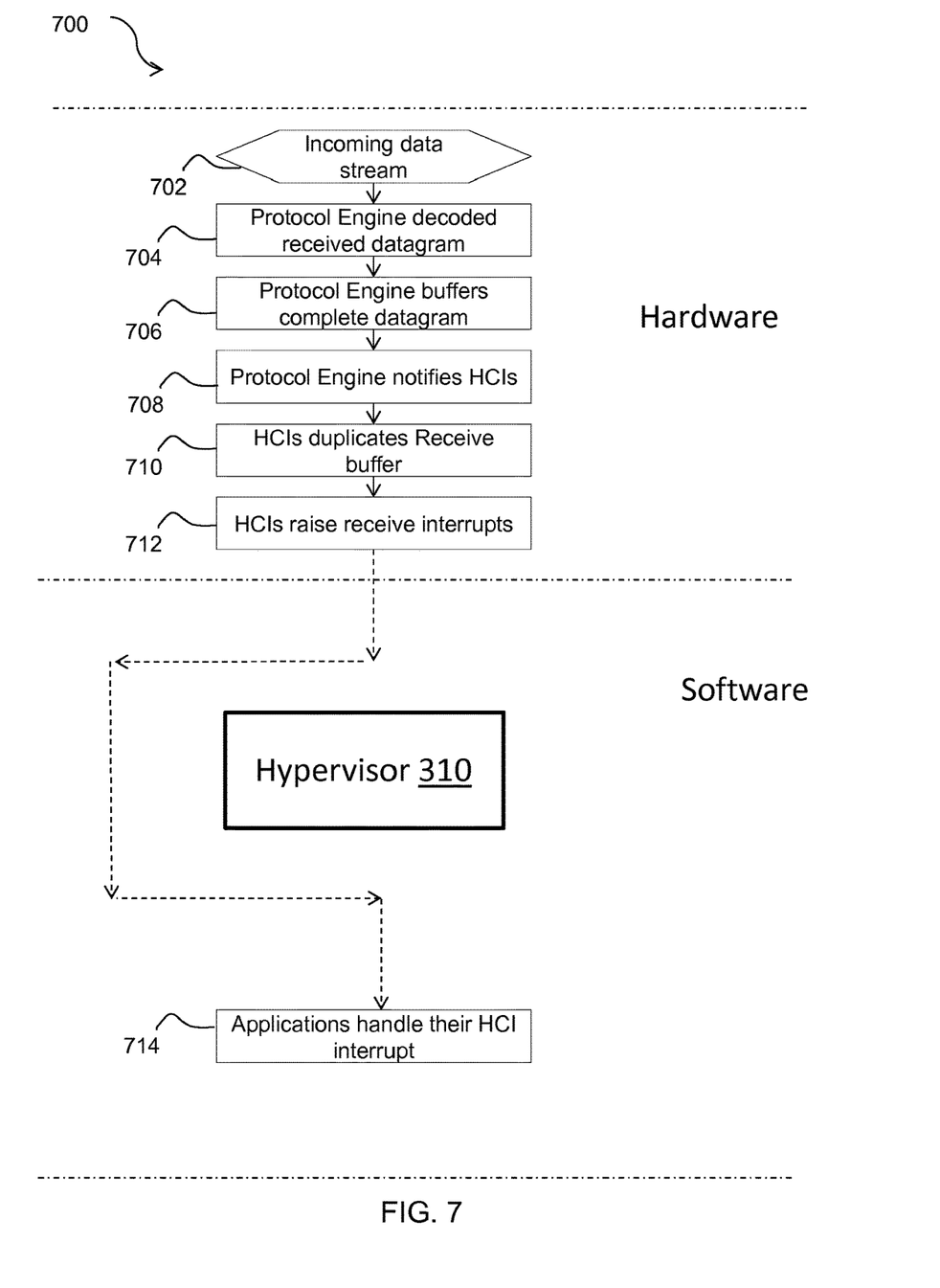
FIG. 7 illustrates an example of a receive operation of a modified multi-core processing device.

Referring to FIG. 7, a flow chart illustrating a 'data receive' operation 700 of a multi-core processing device according to some examples of the invention is shown. In this example, by utilising a number of communication controllers, a hypervisor 310 may be bypassed at least for a 'data receive' operation.

In some examples, at least one of the number of communication controllers may comprise enhanced functionality, wherein the at least one (first) communication controller with enhanced functionality may be operably coupled to one or more (simplified) second communication controller variants.

Initially, at 702, an incoming data stream, which may comprise a plurality of datagrams, may be received by a first communication controller, for example first communication controller 314 of FIG. 3, or first communication controller 620 of FIG. 6, which may be operably coupled to one or more bus network(s). In some examples, the first communication controller 314, 620 may be operably coupled to a plurality of second communication controllers 330, 602, wherein some or all of the second communication controllers 330, 602 may be simplified communication controller variants 330, 602.

At 704, the first communication controller 314, 620 may pass at least one datagram from the incoming data stream to a protocol engine, wherein the protocol engine, which in some examples may be an enhanced protocol engine, and may be arranged to decode the at least one datagram.

Subsequently, at 706, the protocol engine may collate a plurality of datagrams from the decoded at least one datagram and complete a whole datagram by utilising one or more buffers, which may be protocol engine buffers.

At 708, the protocol engine may notify the plurality of second communication controllers 330, 602, via the at least one host controller interface duplicating the at least one datagram stored in the one or more buffers, which may also be receive buffers. Subsequently, at 712, the plurality of host controller interfaces of second communication controllers 330, 602 may raise one or more receive interrupts. In this regard, in some examples, the HCIs require links to an interrupt controller (for example a hardware entity of the SoC), and therefore assigned interrupts. For decoupling, each HCI may therefore have its own interrupts, or the interrupts may be shared, but each HCI has its own interrupt status flags (for example located in registers and in some instances memory mapped). Furthermore, each HCI may copy on its own behalf datagrams from the data buffer (for example by blocking the other HCIs for serialization purposes if data buffers are not multi hosted).

In some examples, the first communication controller 314, 620 may comprise extended functionality that may allow enhanced interrupt status representation and interrupt handling to be performed if, for example, the plurality of second communication controllers 330, 602, is simplified communication controller variants. Therefore, the first communication controller 314, 602 may be operable to manage concurrent accesses by the plurality of second communication controllers 330, 602 direct, with communications not being generated or passing through and being manipulated by the hypervisor 310. Thus, in this example, the one or more receive interrupts that may be generated by the plurality of second communication controllers 330, 602, may bypass the hypervisor 310 and may be received 714 by one or more applications within separate partitions on a multi-core microprocessor.

In some examples of the invention illustrated in the above mentioned FIGs, references to 'partitions' may relate to one or more software partition(s).

Examples of the invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library or dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system on a chip comprising:
   a first communication controller circuit;
   a second communication controller circuit operably coupled to the first communication controller circuit;
   a crossbar interface circuit to provide communication between the first communication controller circuit and the second communication controller circuit;
   a processing core operably coupled to the first communication controller and arranged to support software running on a first partition and a second partition; and
   a virtual machine monitor circuit located between the first and second partitions, and the processing core and arranged to support communications between the first and second partitions, the virtual machine monitor circuit to route a first data frame from the first partition to the second partition;
   the first communication controller circuit is arranged to:
      receive a second data frame from a component external to the system on a chip; and
      communicate the second data frame to the second communication controller circuit via the crossbar interface circuit;
   in response to the second data frame being received at the second communication controller circuit, the second communication controller circuit to route the second data frame to the second partition bypassing the virtual machine monitor circuit, wherein bypassing the virtual machine monitor circuit by the second communication controller circuit comprises:
      offloading functionality from the virtual machine monitor circuit by bypassing, in part or completely, virtual machine monitor circuit functionality selected from a group comprising fan-out, interrupt handling, parts of error handling, and read and write access on datagram buffers, while retaining control by the virtual machine monitor circuit of common communication controller properties selected from a group comprising clock gates and a bitrate; and
      extending functionality of the second communication controller circuit to allow functionality enhancement and concurrent accesses; wherein enhancing functionality comprises enhancing one or more of a first host controller interface, a protocol engine circuit, or one or more data buffers.

2. The system on a chip of claim 1 wherein the first communication controller circuit is arranged to create a copy of the data frame and route the copy to the second communication controller circuit.

3. The system on a chip of claim 2 wherein the second communication controller circuit routes the copy of the data frame to the second partition and the first communication controller circuit routes the data frame to the first partition.

4. The system on a chip of claim 1 wherein the processing core comprises a first processing core operably coupled to the first communication controller circuit and arranged to support software running on a first partition and a second processing core arranged to support software running on a second partition.

5. The system on a chip of claim 1 wherein partitions are mapped to one or multiple cores.

6. The system on a chip of claim 1 wherein the processing core hosts one or more partitions.

7. The system on a chip of claim 1 wherein the first communication controller circuit comprises plurality of components comprising at least one from a group consisting of: the first host controller interface circuit, the protocol engine circuit operably coupled to the first host controller interface circuit, the one or more data buffers, and a bus interface circuit.

8. The system on a chip of claim 7 wherein at least one of the plurality of components is arranged to perform its function for both the first communication controller circuit and the second communication controller circuit.

9. The system on a chip of claim 7 wherein the second communication controller circuit comprises a subset of the first communication controller circuit's plurality of components.

10. The system on a chip of claim 9 wherein each second communication controller circuit comprises only a second host controller interface circuit.

11. The system on a chip of claim 10 wherein a number of second communication controller circuits are operably coupled to the same number of second partitions in bypassing the virtual machine monitor circuit.

12. The system on a chip of claim 9 wherein the first communication controller circuit and the second communication controller circuit are operably coupled to each other via the first host controller interface circuit and a second host controller interface circuit.

13. The system on a chip of claim 12 wherein the first host controller interface circuit and the second host controller interface circuit are arranged to support serialization and synchronization of concurrent accesses to and from the first communication controller circuit.

14. The system on a chip of claim 9 wherein the second communication controller circuit comprises at least one from a group of: a second host controller interface circuit, the protocol engine circuit operably coupled to the second host controller interface circuit, and a data buffer.

15. The system on a chip of claim 14 wherein the protocol engine circuit of the second communication controller circuit is arranged to receive a completely decoded datagram from a first protocol engine circuit of the first communication controller circuit and serve its own copy of the data buffer and second host controller interface circuit.

16. The system on a chip of claim 14 further comprising a communication bus located between a first protocol engine circuit and the first host controller interface circuit of the first communication controller circuit and the second host controller interface circuit of the second communication controller circuit wherein the communication bus is arranged to arbitrate host controller interface circuit accesses and replicate control flow from the first protocol engine circuit to the first host controller interface circuit.

17. The system on a chip of claim 1 wherein the data frame bypassing the virtual machine monitor circuit comprises at least one from a group of: fan-out, received first-in first-out information, interrupt handling, error handling, and read and write access on datagram buffers.

18. The system on a chip of claim 1 wherein second communication controller circuit is arranged to capture and interrogate the data that it receives and transfers from/to the first communication controller circuit.

19. The system on a chip of claim 1 wherein the first partition and the second partition operate asynchronously.

20. A method for a controller supported virtual machine monitor located between first and second partitions of a processing core in a system on a chip, wherein the system on a chip comprises: a crossbar interface; a first communication controller; a second communication controller operably coupled to the first communication controller via the crossbar interface; wherein the method comprises:

running software, by the processing core operably coupled to the first communication controller, on the first partition and the second partition;

supporting, by the virtual machine monitor, communications between the first and second partitions and the processing core;

routing, by the virtual machine monitor, a first data frame from the first partition to the second partition, wherein the first data frame is generated internally at the first partition;

receiving a second data frame by the first communication controller from a component external to the system on a chip;

communicating, by the first communication controller, the second data frame to the second communication controller via the crossbar interface in response to the second data frame being received from the component external to the system on a chip; and in response to receiving the second data frame at the second communication controller, routing, by the second communication controller, the second data frame to the second partition and bypassing the virtual machine monitor, wherein bypassing the virtual machine monitor by the second communication controller offloads functionality from the virtual machine monitor, wherein bypassing the virtual machine monitor by the second communication controller comprises:

offloading functionality from the virtual machine monitor by including a subset of constituent parts or links on a printed circuit board (PCB) or integrated circuit; and extending functionality of the second communication controller to allow functionality enhancement and concurrent accesses; wherein enhancing functionality comprises enhancing one or more of a host controller interface, a protocol engine, or one or more data buffers.

\* \* \* \* \*